United States Patent
Wedeking

(10) Patent No.: US 6,600,915 B1
(45) Date of Patent: Jul. 29, 2003

(54) CELLULAR DEVICE AUTHORIZED USER TRACKING SYSTEMS AND METHODS

(76) Inventor: John K. Wedeking, 3835 N. Paradise Rd., Flagstaff, AZ (US) 86004

(*) Notice: Subject to any disclaimer, the term of this patent is extended or adjusted under 35 U.S.C. 154(b) by 0 days.

(21) Appl. No.: 08/987,188

(22) Filed: Dec. 8, 1997

Related U.S. Application Data

(60) Provisional application No. 60/044,581, filed on Apr. 22, 1997.

(51) Int. Cl.[7] .......................... H04M 3/16; G06F 15/16
(52) U.S. Cl. ...................... 455/410; 713/201; 709/219
(58) Field of Search ................... 455/561, 410, 455/411, 575, 406, 433, 419, 435, 405; 709/217, 219, 216, 225; 713/182, 183, 200, 201, 202

(56) References Cited

U.S. PATENT DOCUMENTS

| | | | |
|---|---|---|---|
| 5,345,595 A | * 9/1994 | Johnson et al. | 455/410 |
| 5,446,903 A | * 8/1995 | Abraham et al. | 710/240 |
| 5,497,412 A | * 3/1996 | Lannen et al. | 455/432 |
| 5,611,048 A | * 3/1997 | Jacobs et al. | 713/202 |
| 5,633,914 A | * 5/1997 | Rosa | 455/411 |
| 5,689,547 A | * 11/1997 | Mölne | 379/379 |
| 5,768,509 A | * 6/1998 | Günlük | 709/203 |
| 5,815,810 A | * 9/1998 | Gallant et al. | 455/433 |
| 5,889,958 A | * 3/1999 | Willens | 709/229 |
| 5,953,652 A | * 9/1999 | Amin et al. | 455/410 |
| 5,974,312 A | * 10/1999 | Hayes, Jr. et al. | 455/419 |
| 6,097,939 A | * 8/2000 | Jacobs | 455/410 |
| 6,181,925 B1 | * 1/2001 | Kaminsky et al. | 455/410 |
| 6,505,039 B1 | * 1/2003 | Boatwright | 455/410 |

* cited by examiner

*Primary Examiner*—William Trost
*Assistant Examiner*—Rafael Perez-Gutierrez
(74) *Attorney, Agent, or Firm*—Armstrong Teasdale LLP

(57) ABSTRACT

Systems and methods which enable fast and simple identification of unauthorized users of cellular telephones are described. In one embodiment, the system includes a plurality of remote computers capable of communicating, e.g., via modem, to a central server which includes an electronic database having a plurality of data entries stored therein. The data stored in the database relates to cellular telephones. When a remote computer initiates communication with the server, the server prompts the user to enter a name and password. The server then checks whether the user is an authorized (valid) server user, and if the user is authorized, the main menu is displayed at the remote computer. Once the operator selects Cellular Tracking/Recovery, then the server causes an electronic serial number (ESN) menu to be displayed at the remote computer. The ESN menu enables an operator to select "Search for ESN" (or by mobile identification number (MIN)) to obtain the relevant data. Once the user selects "Search for ESN", the user is then prompted to input the ESN or MIN which is the subject of the search. The server then searches for a match of the entered ESN or MIN in the database, and if a match is found, the relevant data is displayed at the remote computer. The type and amount of data displayed is controlled, in one embodiment, by the authorized access level of the user.

17 Claims, 4 Drawing Sheets

```
        REGISTRATION DATA ON ESN 'C0094357'

SUBSCRIBER INFORMATION       SUBSCRIBER INFORMATION

NAME......JOHN PUBLIC         MFGR........OKI
  ADDRESS...542 HILLSTREET      CELL TYPE...FLIP
  ADDRESS...APT. 7
  CITY......HILLSDALE           MIN.........(505) 555-3232
  STATE.....MI
  ZIP.......49823               ACTIVATION..01/02/96

DAY PHONE: (505) 555-1212     CARRIER.....CELL CONNECT
  EVE PHONE: (505) 555-7982     DAY PHONE...(505) 555-9856

PRESS [ENTER] TO CONTINUE
```

FIG. 7

```
        REGISTRATION DATA ON ESN '5055553232'

SUBSCRIBER INFORMATION       SUBSCRIBER INFORMATION

NAME......JOHN PUBLIC         MFGR........OKI
  ADDRESS...542 HILLSTREET      CELL TYPE...FLIP
  ADDRESS...APT. 7
  CITY......HILLSDALE           ESN.........C0094537
  STATE.....MI
  ZIP.......49823               ACTIVATION..01/02/96

DAY PHONE: (505) 555-1212     CARRIER.....CELL CONNECT
  EVE PHONE: (505) 555-7982     DAY PHONE...(505) 555-9856

PRESS [ENTER] TO CONTINUE
```

FIG. 8

CELLULAR DEVICE AUTHORIZED USER TRACKING SYSTEMS AND METHODS

CROSS REFERENCE TO RELATED APPLICATIONS

This application claims the benefit of U.S. Provisional Application No. 60/044,581, filed on Apr. 22, 1997.

FIELD OF THE INVENTION

This invention relates generally to cellular devices such as cellular telephones and, more particularly, to systems and methods for assisting in detecting fraud associated with such cellular devices.

BACKGROUND OF THE INVENTION

Unauthorized use of cellular telephones, e.g., due to theft, is an increasing problem as the use of such cellular devices becomes more widespread. The lost revenues associated with such unauthorized use are in the range of hundreds of millions of dollars, and possibly even up to billions of dollars. As such lost revenues continue to rise, there is an increasing need for effective systems and methods for detecting unauthorized use of cellular telephones.

Known methods which have been used in the past for monitoring such unauthorized use include use of a Personal Identification Number, or PIN, in connection with cellular telephones. With this known method, and prior to making a telephone call via the cellular telephone, the customer was required to enter a PIN number into the phone keypad. The PIN number was then checked, and if the PIN was a valid and authorized number, then the customer could proceed with making a call.

Use of PINs, however, was not widely accepted in the cellular industry. Particularly, requiring customers to remember and enter a PIN prior to making each telephone call was a significant burden and inconvenience for the customers. In addition, thieves were still able to steal the PIN along with the cellular telephone number.

Another known method for at least limiting the geographic area in which unauthorized users could make calls with a cellular device is generally referred to as a "Brown Out" method. With the "Brown Out" method, certain calling areas are blocked out from use so that a particular cellular telephone can be used in only limited geographic areas. For example, a cellular telephone authorized for use in the Baltimore area cannot be used to make a call in the Chicago area.

Although the "Brown Out" method has been somewhat successful in at least limiting the extent of unauthorized use, such method results in inconvenience for at least some customers who often travel from an authorized geographic area into an unauthorized geographic area. Further, by limiting the geographic areas in which "authorized" calls can be made, potential revenues are being lost by the cellular telephone companies.

Still another known method includes a computer based control program which tracks calls by tower locations and time. For example, if a call is made through a tower A in Sante Fe, N.Mex., and if another call is made five minutes later from the same number through a tower B in Little Rock, Ark., there is a strong likelihood that at least one of the calls is an unauthorized use. Therefore, the control program blocks at least the later in time call. While the tower tracking control program is useful and effective, such program is not necessarily effective in large cities such as New York or Chicago in which there may be many towers and many valid calls can be made close in time via different towers.

Yet another known method enables a police officer, or other law enforcement agent, to use the cell phone to access the carrier by entering a three digit code that automatically connects with the correct carrier servicing the phone. Particularly, upon identifying possible unauthorized use of a cellular telephone, the officer uses a three digit number from the phone to identify the carrier. After identifying the carrier, the officer then contacts a service which requests that the carrier contact the authorized customer for the subject cellular phone to obtain a release so that information regarding authorized users can be obtained.

Although such method is effective, it requires contacting the authorized user to obtain the release, and if the authorized user is unavailable, difficulties can arise in detaining the suspected unauthorized user. In addition, even if the authorized user is available to provide the release, completing the process may take longer than 20 minutes, which is the usual time period that a suspect can be lawfully detained by police.

In order to more effectively detect, and deter, unauthorized cellular telephone usage, it would be desirable to provide systems and methods which enable simple and fast identification of unauthorized users and are not limited by geographical location. In addition, it would be desirable if such systems and methods minimize inconvenience to authorized users and facilitate reducing lost revenues due to unauthorized use of cellular telephones.

SUMMARY OF THE INVENTION

These and other objects may be attained by systems and methods which enable fast and simple identification of unauthorized users of cellular telephones. More particularly, and in one aspect, the present invention is a tracking system which includes a plurality of remote computers capable of communicating, e.g., via modem, to a central server which includes an electronic database having a plurality of data entries stored therein. The data stored in the database relates to cellular telephones.

When a remote computer initiates communication with the server, the server prompts the user to enter a name and password. The server then checks whether the user is an authorized (valid) server user, and if the user is authorized, the main menu is displayed at the remote computer. Once the operator selects Cellular Tracking/Recovery, then the server causes an electronic serial number (ESN) menu to be displayed at the remote computer. The ESN menu enables an operator to select "Search for ESN" (or by mobile identification number (MIN)) to obtain the relevant data.

Once the user selects "Search for ESN", the user is then prompted to input the ESN or MIN which is the subject of the search. The server then searches for a match of the entered ESN or MIN in the database, and if a match is found, the relevant data is displayed at the remote computer. The type and amount of data displayed is controlled, in one embodiment, by the authorized access level of the user.

The above described system and method are believed to more enable easy and quick identification of relevant information related to cellular telephones so that officers can more easily and quickly determine whether a particular user is authorized to use a particular telephone. In addition, the system and method are not limited by geographical location and do not present any substantial inconvenience to authorized cellular telephone users.

BRIEF DESCRIPTION OF THE DRAWINGS

FIG. 7 is an ESN registration data display screen generated by the system shown in FIG. 1.

FIG. 8 is a MIN registration data display screen generated by the system shown in FIG. 1.

DETAILED DESCRIPTION

Figure 1:
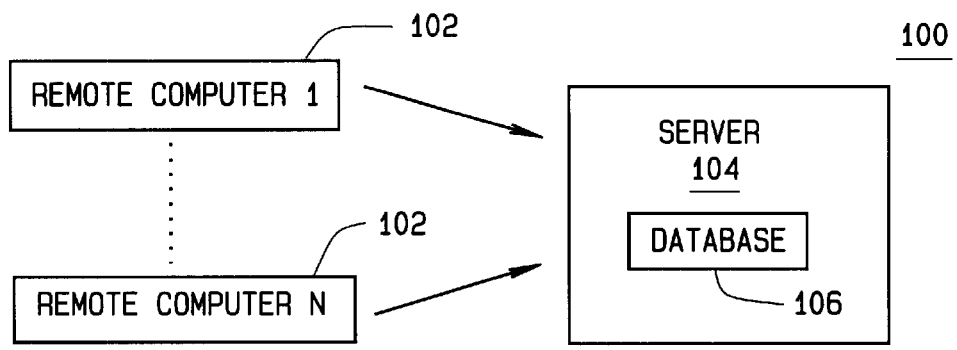
FIG. 1 is a block diagram illustration of a hardware configuration utilized in connection with one embodiment of the present invention.

FIG. 1 is a block diagram illustration of a hardware configuration utilized in connection with one embodiment of the present invention. Particularly, tracking system 100 includes a plurality of remote computers (1 . . . N) 102 capable of communicating, e.g., via modem, to a central server 104 which includes an electronic database 106 having a plurality of data entries stored therein. Computers 102 can be located, for example, at fixed locations such as at police stations or can be remotely located in vehicles. Computers 102 also could be hand held units. In one particular embodiment, computers 102 are personal computers located at selected locations accessible by law enforcement officers and agents and include a modem for communicating, via telephone lines, with server 104.

Server 104 can be, for example, a personal computer, or a Sun or DEC workstation, and operate in an NT, UNIX, or VMS based environment. Such computers, workstations, and operating systems are well known in the art and are commercially available. In addition, server 104 can be loaded to operate a software package generally known as Wildcat Version 5, commercially available from Mustang Software, 6200 Lake Ming Road, Bakersfield, Calif. 93306. Wildcat Version 5 operates as a systems administrator including assignment of names and initial passwords, and establishing security access levels.

Database 106, in one embodiment, is an Oracle database commercially available from Oracle Corporation, 500 Oracle Parkway, Redwood Shores, Calif. 94065. The data stored in database 106 relates to cellular telephones as described hereinafter in more detail in connection with the various screen displays. C++ can be used to create a sequel statement to search and retrieve individual data from the Oracle database. C++ is commercially available from Boreland International, 100 Boreland Way, Scotts Valley, Calif. 95066.

Figure 2:
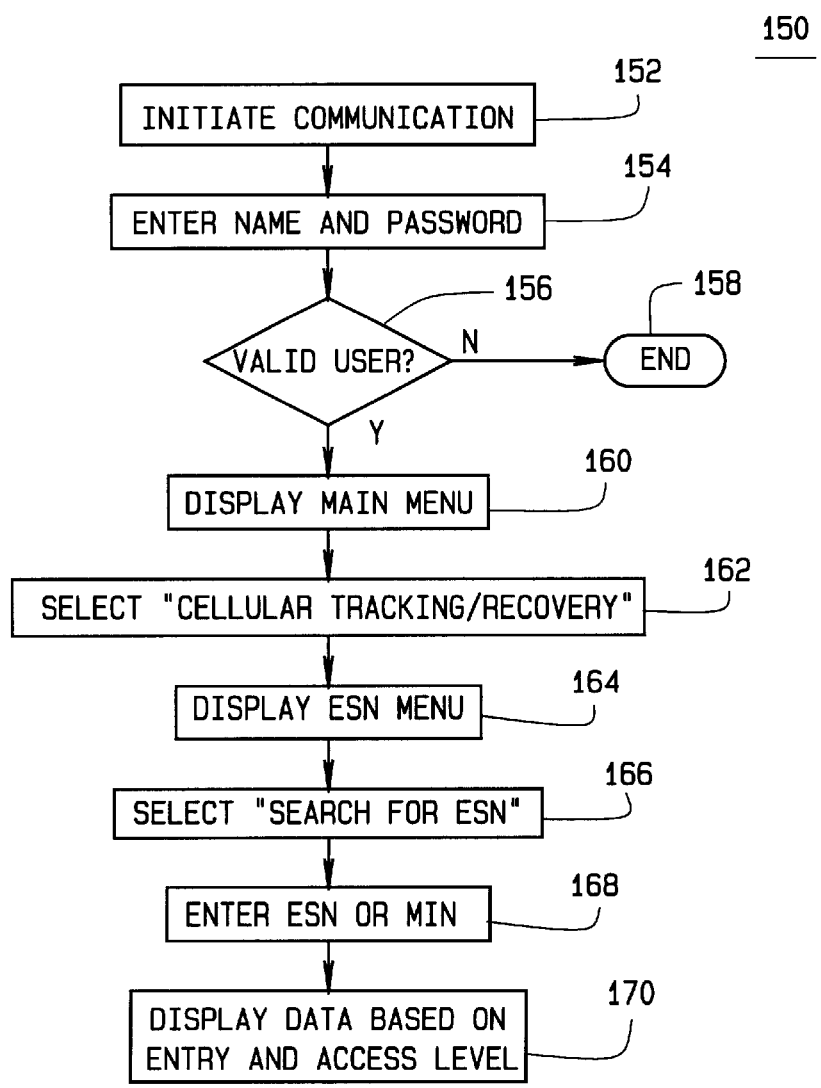
FIG. 2 is a flow chart illustrating process steps utilized in connection with or executed by the system shown in FIG. 1.

FIG. 2 is a flow chart 150 illustrating process steps utilized in connection with, and executed by, system 100 shown in FIG. 1. The control software which controls execution by server 104 can be written, for example, in C++ and can incorporate code from the Oracle database to enable generation of the various screen displays. Of course, the specific code and execution routines may vary and the flow chart illustrated in FIG. 2 is just one example of many alternative implementations.

Referring specifically to FIG. 2, a remote computer 102 initiates 152 communication with server 104 via a modem link. Of course, other forms of communications such as a radio link could be utilized. In any event, once communications are established, server 104 prompts the user to enter a name and password 154. Server 104 then check (e.g., via Wildcat Version 5) whether the user is an authorized (valid) server user 156, and if not, processing ends 158. If the user is authorized, then the main menu is displayed 160 at the remote computer. The particular format of, and data displayed on, the main menu may vary depending upon the particular needs of the particular user. Of course, and to enable entry into the routine for determining whether a possible unauthorized user of a cellular telephone is in fact unauthorized, at least one of the menu selection items should enable the user to enter the subject routine. Such a selection may be displayed, for example, as the "Cellular Tracking/Recovery" item 162.

Once the operator selects Cellular Tracking/Recovery, then server causes an ESN menu 164 to be displayed at remote computer 102. The ESN menu enables an operator to select "Search for ESN" (or by MIN) 166 to obtain the relevant data. The ESN menu may, of course, include other selections such as Exit.

Once the user selects "Search for ESN", the user is then prompted to input the ESN or MIN which is the subject of the search 168. Server 104 then searches for a match of the entered ESN or MIN in database, and if a match is found, the relevant data is displayed 170. The type and amount of data displayed is controlled, in one embodiment, by the authorized access level of the user.

Figure 3:
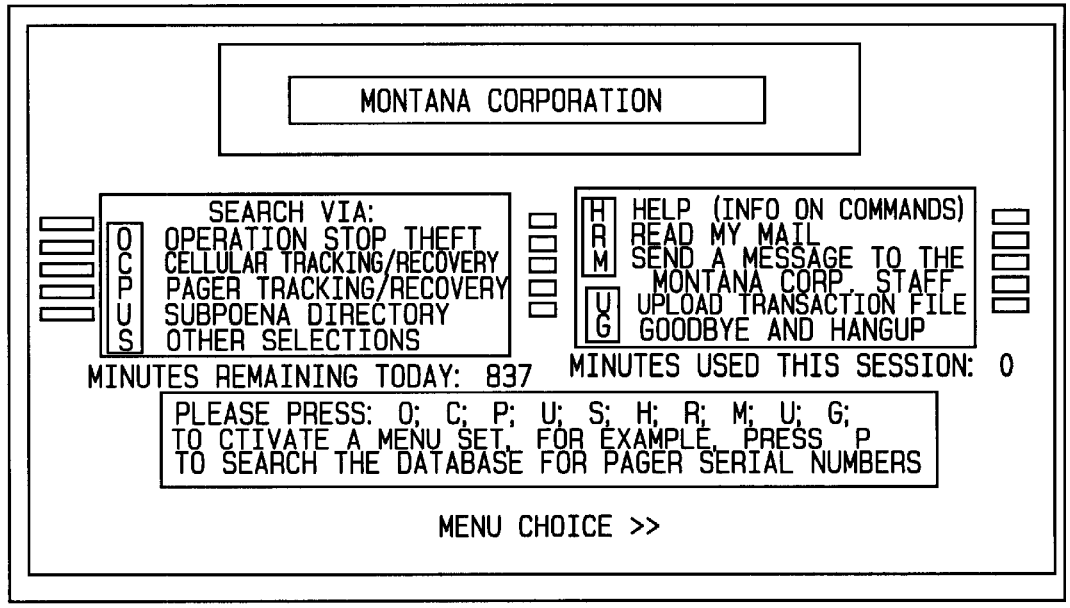
FIG. 3 is a menu display screen generated by the system shown in FIG. 1.

Specific embodiments of the various screen displayed generated by server 104 are set forth in FIG. 3–8. Particularly, FIG. 3 is an exemplary main menu display screen generated by server 104. As shown in FIG. 3, the user can select various types of searches identified in the "Search Via:" selection box. Of course, in the "Search Via:" box, one menu selection item is the "Cellular Tracking/Recover" item. By pressing a "C" on the remote computer keyboard, the subject routine is selected. Other items displayed on the main menu display include a help option, as well as e-mail and other options.

Figure 4:
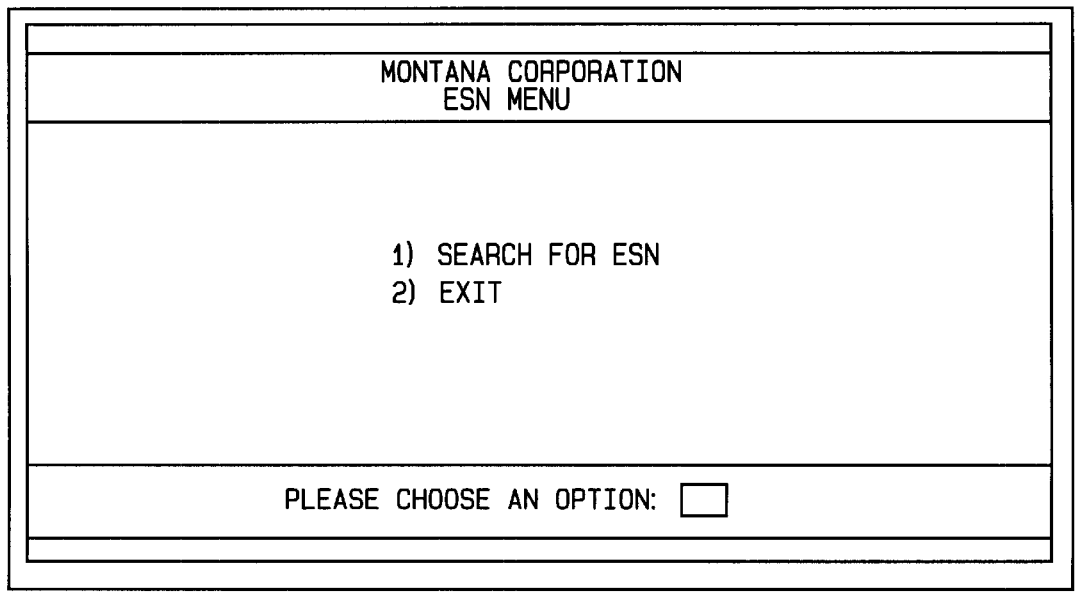
FIG. 4 is an ESN menu display screen generated by the system shown in FIG. 1.

FIG. 4 is an exemplary ESN menu display screen generated by server 104. As explained above, database 106 is configured to enable search by either ESN or MIN, and ESN menu display could be modified to include a selection of searching by MIN. In the form as shown in FIG. 4, however, if a user desires to run a search, the user simply selects "1) Search for ESN" by entering a "1" at the prompt.

Figure 5:
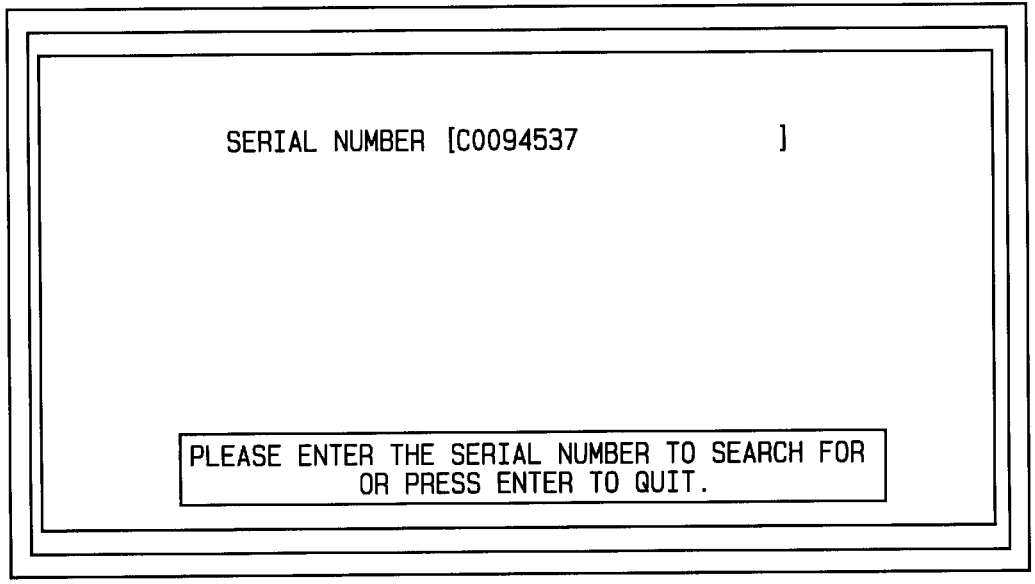
FIG. 5 is a prompt display screen generated by the system shown in FIG. 1 with an ESN entered.
Figure 6:
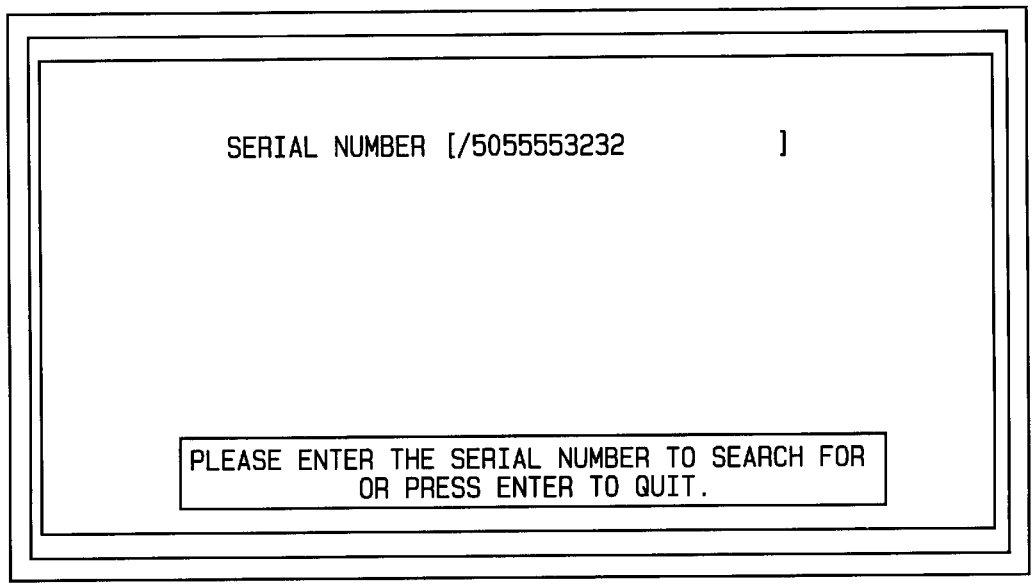
FIG. 6 is the prompt display screen generated by the system shown in FIG. 1 with an ESN entered.

FIG. 5 is a prompt display screen generated by server 104 once the user has selected "1) Search for ESN" as described above. In FIG. 5, an exemplary ESN has been entered. If the user desires to search by MIN, then as shown in FIG. 6, the user first enters a "/" and then types in the MIN immediately after the "/".

FIG. 7 is an exemplary ESN registration data display screen generated by server 104, and FIG. 8 is a MIN registration data display screen generated by server 104. The data is stored in database 106, and when a match is found between a stored ESN and an input ESN, the data is displayed to the user in the format shown in FIG. 7. Of course, the particular format and data can vary depending upon the needs of the user. The data displayed to the user based on an ESN input includes the MIN.

In one embodiment, two different levels of users are established—level 1 and level 2. For a level 1 and level 2 users, and based on an ESN search, the same information is displayed. If a MIN search is run, however, a level 1 user is not provided with the ESN. For a MIN search run by a level 2 user, the ESN is displayed.

The systems and methods described above are believed to more effectively detect, and deter, unauthorized cellular telephone usage than known systems and method. In addition, the present systems and methods enable simple and fast identification of unauthorized users and are not limited by geographical location. Further, such systems and methods minimize inconvenience to authorized users and facilitate reducing lost revenues due to unauthorized use of cellular telephones.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method of controlling operation of a central server utilized in connection with a system for determining whether a user is an authorized user of a particular cellular telephone, the telephone being assigned at least one of an electronic serial number and a mobile identification number, said server capable of being linked to a remote unit for communications therewith and comprising a central electronic database having a plurality of entries searchable by at least one of the electronic serial number and the mobile identification number, said method comprising the steps of:

searching the electronic database to obtain data related to at least one authorized user of the telephone;

selecting data to be displayed based on a preassigned access level; and displaying the data related to the at least one authorized user, the data related to at least one authorized user comprising telephone type and telephone manufacturer.

2. A method in accordance with claim 1 further comprising the steps of causing a mobile identification number to be displayed on a display screen of the remote unit when the database is searched by electronic serial number, the mobile identification number being associated with the electronic serial number, and causing an electronic serial number to be displayed on a display screen of the remote unit when the database is searched by mobile identification number, the electronic serial number being associated with the mobile identification number.

3. A method in accordance with claim 2 wherein the data displayed on a display screen of the remote unit is selected based on a preassigned access level.

4. A method in accordance with claim 1 further comprising the step of causing a mobile identification number to be displayed on a display screen of the remote unit when the database is searched by electronic serial number, the mobile identification number being associated with the electronic serial number.

5. A method in accordance with claim 1 further comprising the step of causing an electronic serial number to be displayed on a display screen of the remote unit when the database is searched by mobile identification number, the electronic serial number being associated with the mobile identification number.

6. A method in accordance with claim 1 further comprising the step of causing the obtained data to be displayed on a display screen of the remote unit.

7. A method for determining whether a user is an authorized user of a particular cellular telephone, the telephone being assigned at least one of an electronic serial number and a mobile identification number, said method comprising the steps of:

identifying at least one of an electronic serial number and a mobile identification number associated with the telephone;

searching a central electronic database having a plurality of entries searchable by at least one of the electronic serial number and the mobile identification number to obtain data related to at least one authorized user of the telephone, the central electronic database accessed by a central server;

selecting data to be displayed based on a pre assigned access level; and displaying authorized user registration data associated with a search, said registration data comprising telephone type and telephone manufacturer.

8. A method in accordance with claim 7 further comprising the steps of displaying a mobile identification number on a display screen of a computer located remote from the electronic database when the database is searched by electronic serial number, the mobile identification number being associated with the electronic serial number, and displaying an electronic serial number on a display screen of a computer located remote from the electronic database when the database is searched by mobile identification number, the electronic serial number being associated with the mobile identification number.

9. A method in accordance with claim 7 further comprising the step of displaying a mobile identification number on a display screen of a computer located remote from the electronic database when the database is searched by electronic serial number, the mobile identification number being associated with the electronic serial number.

10. A method in accordance with claim 7 further comprising the step of displaying an electronic serial number on a display screen of a computer located remote from the electronic database when the database is searched by mobile identification number, the electronic serial number being associated with the mobile identification number.

11. A method in accordance with claim 7 further comprising the step of displaying the obtained data on a display screen of a computer located remote from the electronic database.

12. A system for determining whether a user is an authorized user of a particular cellular telephone, the telephone being assigned at least one of an electronic serial number and a mobile identification number, said system comprising:

a central computer server capable of being linked to a remote unit for communications therewith;

said central computer server comprising a central electronic database having a plurality of entries searchable by at least one of the electronic serial number and the mobile identification number, said server configured to display authorized user registration data associated with a search, said registration data comprising telephone type and telephone manufacturer and, said server further configured to select data to be displayed based on a preassigned access level.

13. A system in accordance with claim 12 wherein said server is configured to cause display screens to be displayed at the remote unit, and said server is configured to display a mobile identification number when said database is searched by electronic serial number, the mobile identification number being associated with the electronic serial number, and said server is configured to display an electronic serial number when said database is searched by mobile identification number, the electronic serial number being associated with the mobile identification number.

14. A system in accordance with claim 13 wherein said server selects data to be displayed on said display screen based on a preassigned access level.

15. A system in accordance with claim 12 wherein said server is configured to cause display screens to be displayed at the remote unit.

16. A system in accordance with claim 15 wherein said server is configured to display a mobile identification number when said database is searched by electronic serial number, the mobile identification number being associated with the electronic serial number.

17. A system in accordance with claim 15 wherein said server is configured to display an electronic serial number when said database is searched by mobile identification number, the electronic serial number being associated with the mobile identification number.

* * * * *